United States Patent
Steimann et al.

(10) Patent No.: US 9,815,318 B1
(45) Date of Patent: Nov. 14, 2017

(54) METHOD OF CREATING WEATHERING EFFECTS ON MODELS

(71) Applicants: Joseph Steimann, St. Charles, MO (US); Edward Hoffman Bauer, St. Charles, MO (US)

(72) Inventors: Joseph Steimann, St. Charles, MO (US); Edward Hoffman Bauer, St. Charles, MO (US)

(*) Notice: Subject to any disclaimer, the term of this patent is extended or adjusted under 35 U.S.C. 154(b) by 245 days.

(21) Appl. No.: 14/634,785

(22) Filed: Feb. 28, 2015

Related U.S. Application Data

(60) Provisional application No. 61/950,649, filed on Mar. 10, 2014.

(51) Int. Cl.
| | | |
|---|---|---|
| *B44C 1/17* | (2006.01) | |
| *B32B 37/02* | (2006.01) | |
| *B32B 37/12* | (2006.01) | |
| *B44C 1/175* | (2006.01) | |
| *B32B 37/26* | (2006.01) | |
| *B32B 37/00* | (2006.01) | |
| *B32B 37/10* | (2006.01) | |

(52) U.S. Cl.
CPC .......... *B44C 1/1754* (2013.01); *B32B 37/003* (2013.01); *B32B 37/12* (2013.01); *B32B 2037/109* (2013.01); *B32B 2037/268* (2013.01); *Y10T 156/1062* (2015.01)

(58) Field of Classification Search
None
See application file for complete search history.

(56) References Cited

U.S. PATENT DOCUMENTS

| | | | | |
|---|---|---|---|---|
| 3,890,449 | A | * | 6/1975 | Mezquita ............... B65D 23/14 215/12.1 |
| 4,317,847 | A | | 3/1982 | Batistelli |
| D263,854 | S | | 4/1982 | Calvert |
| 4,416,940 | A | | 11/1983 | Loye |
| 4,666,756 | A | | 5/1987 | Sakata |
| 5,075,137 | A | | 12/1991 | Kuras |
| 5,447,760 | A | | 9/1995 | Watras |
| D370,939 | S | | 6/1996 | Schaeffler |
| D388,832 | S | | 1/1998 | Stiemert |
| 6,261,658 | B1 | | 7/2001 | Schmidt |
| 6,419,781 | B2 | * | 7/2002 | Truc ..................... H04N 1/3875 156/277 |
| D476,488 | S | | 7/2003 | White |

(Continued)

FOREIGN PATENT DOCUMENTS

WO    WO 02068191 A1 *  9/2002    .............. B41M 3/12

OTHER PUBLICATIONS

Make your own decals—Model Railroader Magazine, 7 pages, Apr. 2001.*
How to Paint Faux Rust, 33 pages, Nov. 2013.*

*Primary Examiner* — Linda L Gray
(74) *Attorney, Agent, or Firm* — CreatiVenture Law; Linda L. Lewis

(57) ABSTRACT

A method of weathering scale and un-scale models comprising creating a custom illustration of a weathering effect such as rust streak, splashed and splattered mud, oil and grease, grime, a crease, a dent, burns and other effects on a background, making an image of the painting and printing the image onto a receptive coating to create a decal, and the decal is applied to the model thereby creating a weathering effect.

18 Claims, 3 Drawing Sheets

(56) References Cited

U.S. PATENT DOCUMENTS

| | | | |
|---|---|---|---|
| 6,609,546 B1 | 8/2003 | Bobb | |
| 6,623,817 B1 | 9/2003 | Yang | |
| 7,547,372 B1 | 6/2009 | Sloan | |
| 7,622,237 B2 | 11/2009 | Banhazl | |
| D686,666 S | 7/2013 | Lee et al. | |
| 9,327,445 B1* | 5/2016 | Boone | B60B 7/00 |
| 2003/0013027 A1* | 1/2003 | Wallace | B44C 1/1752 |
| | | | 430/31 |
| 2006/0246266 A1 | 11/2006 | Hall | |
| 2007/0065620 A1* | 3/2007 | Nonaka | B32B 7/06 |
| | | | 428/40.1 |

* cited by examiner

METHOD OF CREATING WEATHERING EFFECTS ON MODELS

CROSS-REFERENCE TO RELATED APPLICATIONS

This application claims the benefit of U.S. Provisional Patent Application No. 61/950,649 filed Mar. 10, 2014 which is hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention relates to a method of providing weathering effects to model railroad cars, and more particularly to a method of using decals to provide weathering effects to models such as scale model railroad equipment, vehicles, aircraft, military equipment such as tanks, ships, aircraft, scale and non-scale models, including model cars, trucks, tanks, ships, submarines, buildings, bridges, ads, signs, roadway, pavement, structures, containers, dumpsters, vessels and paved surfaces.

Related Art

Modeling enthusiasts have been using a variety of methods involving paints, chalks, powders, sanding, washes, stains, and other techniques to provide weathering effects to their models. These techniques are extremely time-consuming and challenging, particularly if one lacks artistic expertise. At the same time, the model enthusiast wants to customize and individualize his model and have the option of adding weathering effects according to his or her personal taste. The present invention is an entirely different method of providing weathering to models that is simple, quick, and requires little artistic skill. Because the weathering decals can be added and positioned as desired, it provides the model enthusiast with an additional option in creating his or her uniquely weathered model.

Many objects spend years out in the elements and many show the signs of this long and hard service life. Weathering can take many forms; rust, grime, patched paint, faded letters, stains, and fire damage. There are almost as many ways to recreate the ravages of time and nature.

U.S. Pat. No. 5,075,137 discloses a method of weathering a model of an object, the steps comprising: (a) applying to a surface of said model, a suspension of a rust-colored coloring agent within a carrier adapted to spread the same as flakes over said surface; (b) and thereafter removing said carrier by drying said model to leave said flakes.

RUSTALL™ is a four step commercial product for scaled models, such as model trains, that provides a realistic rusty look. For step one, the RUSTALL™ product is stirred and a brush dipped into the liquid, some liquid "rust" is randomly applied to the model. In step two, the model is backwashed to add dimension to by bringing out depth and texture around bolts, hatches and other fine detail. In step three, deadflat is applied, which gives a random and natural flat finish. In step four the model is dusted with clay silt that has been ground and sifted several times into a fine dust.

Chalks can be used to provide weathering effects. To provide rust a small stiff brush is used, or the color is applied directly from the chalk stick. Using a variety of deep brown and orange colors can create interesting effects of old and new rust. A stiff brush is used to drag rust streaks vertically down the sides of the car from the initial application. Other techniques include the use of alcohol pens and drybrushing. Rust splotches can be made with sponges and acrylic paint. Diluted acrylic paint can be washed over the model to give a weathering effect. Additional techniques include airbrush, sponge application, cotton swab application, make up brush, pencils, markers and dust applicators.

Particularly challenging are vertical rust streaks that are the result of rusty water running down the side of an object. It requires patience, skill, and a steady hand to create thin vertical parallel lines of realistic weathering effects. Weathering a model can take weeks or months of work to achieve the desired look, but with the present method can be applied quickly.

In other related technologies, U.S. Pat. No. 4,317,847 discloses method of producing a simulated weathered antique wood finish on a surface which comprises the three separate steps of applying opaque colored coats of paint over the surface. U.S. Pat. No. 4,416,940 discloses a two-step process for imparting a simulated weathered-copper appearance to a substrate which comprises first applying an opaque pigmented base coat containing a dominant patina-color-producing colorant to a substrate; curing the base coat; applying to the cured base coat a non-opaque top coat containing one or more copper-color-producing additives in an amount sufficient to impart a simulated weathered-copper appearance None of the above-referenced methods disclose the present invention which uses a new approach to weathering that uses decals to create various weathering effects. The use of decals saves the scale model enthusiast many hours of work without sacrificing the custom-made realistic weathering look the model enthusiast wants.

SUMMARY OF THE INVENTION

A method of weathering scale models comprising creating illustrations of weathering effects such as rust streaks, scratches, splashed and splattered mud, oil and grease, general grime, creases, dents, burns and other effects on a background, making a digital image of the illustrations and printing them onto a receptive medium to create the decals. The decals are selectively positioned and applied to create weathering effects on the model.

In one embodiment, the receptive coating is one part of a four layer printable waterslide transferable media: (1) a water-absorbing porous backing sheet, (2) a water soluble resin-coating applied to said backing sheet, (3) a waterproof film-forming resin coating, and (4) a waterproof media receptive coating. The waterproof media receptive coating preferably comprises: (1) a binder (2) a charge control agent (3) a cross-linking agent (4) an adhesion enhancing agent, and (5) a dispersant. Such a transferrable image product is disclosed in U.S. Pat. No. 6,623,817, which is hereby incorporated by reference. Graphics are obtained through the printing of a media printer based on its reception by a waterproof media receptive coating layer. A resin-coated carrier sheet forms a tough thin film which seals and isolates the printed graphics from being dissolved by water when the imaging sheet is soaked in water. Once soaking starts, the resin dissolves and the thin film is released and glue is generated. This serves to adhere the printed graphics to the receiving surface on the model.

Typically, the media is soaked in water for 30 to 60 seconds until the film portion of the media slides off the carrier sheet allowing transfer to a receiving surface on the model.

A plurality of ink layers on resin create the copy of the painted weathering effect decals. The decals are printed on a clear background, and do not have to be precisely trimmed around the edges before being applied to achieve the desired appearance.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
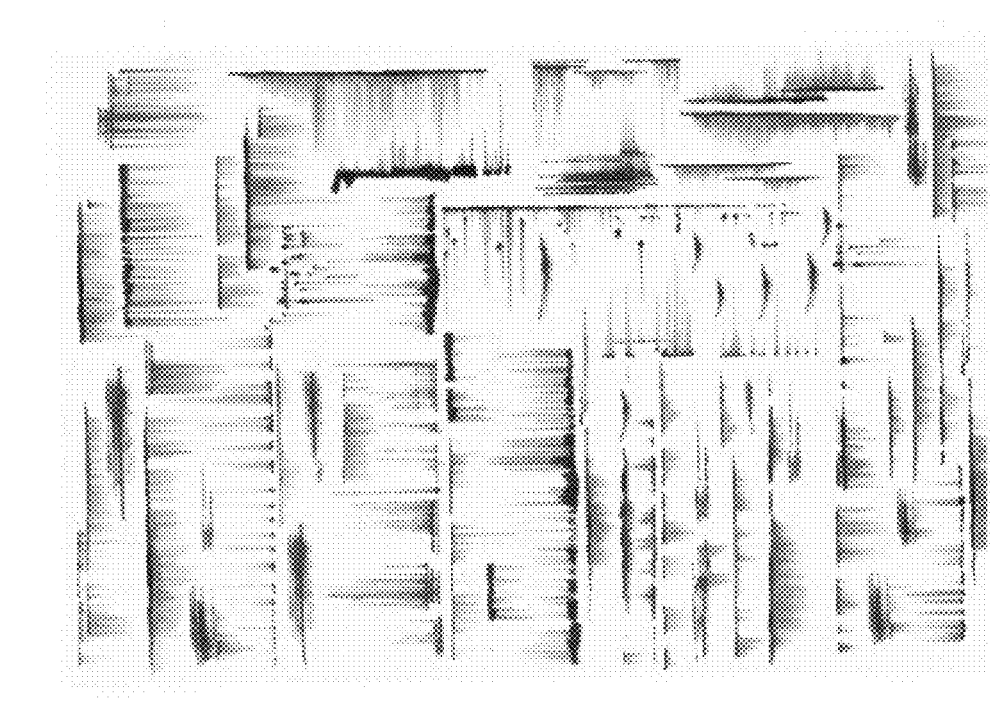
FIG. 1 is a copy of a digital image of a sheet of decals of the weathering effects of the present invention which are medium rust scratches.

The following description of the preferred embodiment(s) is merely exemplary in nature and is in no way intended to limit the invention, its application, or uses.

Key elements of the present invention are further discussed as follows:

Creating the Weathering Effects on a surface: Weathering effects, such as rust streaks, splatters and smudges can be painted on a surface, such as white art paper typically using acrylic paints, but other paints or media such as pictures, drawings, sketches, figures, images, plates, prints, artwork, water colors, oils pastels or chalks are suitable. In another embodiment, the weathering effects are photographed and printed in the desired size appropriate for a model.

Creating a digital copy: Suitable methods can be used such as scanning or uploading into a computer or photographing with a digital camera. The appropriate copy size and color intensity is selected. In a preferred embodiment, different colors, such as black, brown, white or gray can be selected for the same effect, such as streaks due to rust, rain, lime, oil or dirt.

The digital copy can be ink jet printed on the following decal printable waterslide transferable media: (1) a water-absorbing porous backing sheet, (2) a water soluble resin-coating applied to said backing sheet, (3) a waterproof film-forming resin coating, and (4) a waterproof media receptive coating.

Water-Absorbing Porous Backing Sheet

The substrates include book papers, commercial printing papers, uncoated or coated groundwood papers, paperboard, specialty craft papers, converted papers, non-resin coated photographic background paper, clay-coated cardboard paper or various paperboard alternatives.

Water-Soluble Resin Coating

The water-absorbing porous backing sheet is coated with water-soluble polymer, either natural or synthetic type. The natural polymers include gelatin (GEL), gelatin extenders, gelatin derivatives, graft polymers of gelatin other natural polymers and synthetic hydrophilic colloidal homo-polymer and co-polymer, and aqueous dispersions of hydrophobic homo-polymer and co-polymer. Gelatin includes acid or base treated cow bone gelatin, pigskin gelatin, and fish gelatin. Other natural polymers include Arabic gum, albumin and casein, sugar derivatives such as cellulose (CEL) derivatives (e.g., hydroxyethyl cellulose, carboxymethyl cellulose, cellulose sulfate and cellulose acetate butyrate), sodium alginate, and starch derivatives. Synthetic polymers include polyvinyl acetate butyrate, sodium alginate, and starch derivatives, polyvinyl alcohol (PVOH), polyvinyl alcohol partial acetyl, polyethylene glycol (PEG), poly (2-ethyl-2-oxazoline) (PEOX), polyamides, acrylate derivatives (e.g., polyacrylic acid, polymethacrylic acid, polyacrylamide), polyvinyl imidazole, and polyvinylpyrazole and positively charged polyurethane.

Dispersions using hydrophobic polymers such as polyvinylidone chloride, polyethlacrylate, or hard thermoplastic acrylic co-polymers may be applicable, as well. Commercially available "Waterslide decal paper" can also be used for this purpose. For example, Tullis Russell decal paper, manufactured by the Brittain Paper Mills, located at Commercial Road, Hanley, Stock-on-Trent ST1 3QS, U. K., is applicable. One side of the Tullis Russell decal paper is coated with polyvinyl alcohol (PVA). The paperweight is in the range of 25-85 lb, preferably 35-65 lb, or more preferably, 45-55 lb.

The application is recommended at relative humidifies in the range of from about 50-60% (RH), preferably 55 plus or minus 2% RH and at room temperature. Trucal premium grade is a special grade paper from the family of Tullis Russell decal base. It is used for obtaining the most exacting high quality decoration of pottery, glass and vitreous enamelware, ideal for precious metals, heavy enamel effects and other demanding applications. Its nominal substance is 180 gsm, nominal gum coat 3.5 gsm, nominal caliper 220 um, moisture content in equilibrium with 50-60% RH. The base paper is specially formulated twin wire paper, the release time is less than 60 seconds. Tryflat waterslide transfer paper is another special grade Tullis Russell paper, which can also be applied for this invention, with a similar structure to the Trucal paper, except that the nominal substrate is 180 gsm, the nominal gum coat 4.0 gsm, and the nominal caliper 220 um.

Waterproof Film Forming Resin Coating

A waterproof film-forming resin coating serves the following two purposes. First, it generates a tough, thin film which carries the printed graphics to slide-off the carrier sheet after soaking in water and easily transferring to a receiving surface. Second, once soaking starts, the water soluble resin dissolves. The thin waterproof film with the printed graphics is released, and a glue is generated by the water soluble resin, so that the thin film with the printed graphics will adhere to the receiving surface upon positioning. The ideal polymer is a thermoplastic type. It must have precision dimensional stability. It must be waterproof and chemically inert. It must form a tough, strong, flexible film over the surface of the water-soluble resin coated on the carrier paper. Suitable film-forming resins include polymethacrylate, polymethyl methacrylate, polybutyl methacrylate, polystyrene, polystyrene butadiene, polyethylene urethane, polyurethane acrylics, polyamide acrylics, nitrocellulose, acrylic nitrocellulose, cellulose acetate, cellulose acetate butyrate, cellulose acetate propionate, cellulose ether, polyvinyl acrylics, alkyd resin, acrylic alkyd resin, epoxide, epoxy novolac resin, epoxy ester resin, melamine resin, acrylic melamine resin, melamine formaldehyde resin, urea formaldehyde resin, phenolics, polyvinyl, polyvinyl ester, polyvinyl acetate, polyvinyl chloride, polyvinyl chloride acetate, polyvinyl alcohol, etc., specifically formulated lacquers can also be used for this purpose. The coating is applied at room temperature and the film is formed by evaporation of the solvent.

Waterproof Media Receptive Coating:

The waterproof media receptive coating (top coat) of the present invention comprises the following components:

(a) Binder: The binders function is to bond pigment particles to one another and to the surface of the plastic or foil substrate stock. The binder determines the viscosity of the coating mix and its drying characteristics. The binder has a great deal to do with the ink acceptance (hence the printability), the smoothing or calendaring properties, water and oil resistance, and the pick strength and foldability of the coated substrate.

(b) Charge Control Agent: Conductive polymers are selected to interact with the dye molecules on the ink receptive layer. Hydrophilic cationic homo-polymers or co-polymers having positive charges that are capable of electrically absorbing negatively charged ink jet ink ions are used. The positive charge carried by the conductive polymer attracts the anionic dye ions in the ink and thus functions to localize and fix the dye.

(c) Cross-Linking Agent: Inorganic and organic compounds capable of reacting with the primary polymer matrix by forming chemical or hydrogen bonds with its hydroxyl, carboxyl, NH or other functional groups to form a strong linkage are employed. They serve to increase melting point, reduce swelling after immersion in water, waterproof the network and provide abrasion, scratch and smudge/scuff resistance. The composition can be self-cross linking where it has hydroxyl functional groups; or other cross-linking agents such as epoxy, formaldehyde, or glyoxal can be incorporated.

(d) Adhesion Enhancing Agent: Gelatin, alpha-olefin such as polyethylene polypropylene, ethylene acrylic acid and poly-acrylic acid may be incorporated in the present composition.

(e) Dispersant: Surfactant or wetting agents are employed to reduce the surface tension of the substrate so that the normal coating can be uniformly spread without streaking or other undesirable coating defects. Examples of surfactants include anionic polymers (polyacrylic, lignosulfonate, naphthalene sulfonate), alkali silicates, nonionic polymers (fatty alcohols, ethylene oxide), and various fluorinated surfactants.

(f) Porous Ink-Absorptive Pigment: Such pigments may optionally be present where a non-glossy product is desired. In such cases, various fine-grained, micro-porous, negatively or positively charged pigments such as silica gels are preferred. The waterproof media receptive coating preferably comprises: (1) a binder (2) a charge control agent (3) a cross-linking agent (4) an adhesion enhancing agent, and (5) a dispersant.

Printing

The digital image design is downloaded from the Internet or other digital resources using a Media printer Print either Apple, HP, Canon, or Epson Stylus Media printers with test patterns containing colored blocks (cyan, magenta, yellow, red, green, blue and black). The black ink may be composite or pigmented, however, the composite is preferred. Use settings: "Photo Quality Glossy Film", on "Custom" mode, Print Quality: Photo 1440 dpi, High Quality Half toning, Photo Enhanced, Sharpness: High. Drying time: record ink drying time right after the printing. Waterproof test: leave under running tap water for two hours. Smudge test: under tap water, smudge the image using a finger.

Decal Transfer

The following procedure is used to transfer the decal. (1) Make sure the receiving surface is clean and dry. (2) Use a scissors or a razor edge to cut the desired decal. (3) With a wet sponge, cloth, or paper towel, thoroughly soak water-absorbing porous backing paper several times, or soak the entire cut decal together with the backing sheet in water for 1-1½ minutes. (4) Gently slide off a thin film with the decal off the side of the porous backing paper. If the film is not slidable, stop and wet again until the thin film is movable and totally slides away from the backing paper carrying the water-soluble adhesive with it. (5) Position the decal carried by the thin film to the receiving surface, illustration side up, adhesive side down, against the receiving surface. (6) Gently press the image and make necessary adjustment until the decal is perfectly positioned. (7) Use a dry sponge, cloth, or paper towel, smooth decal and gently absorb excess water, and let dry.

The decal is now permanently adhered to the receiving surface.

In a preferred embodiment, the printer is a VersaCAMM® VSi series printer using high-density eco-solvent ink. In a more preferred embodiment, the printer includes the white ink option, which allows a layer of white ink to be laid down under the colored inks which are used to create the desired design. This is particularly useful when creating opaque graffiti decals or when applying a decal to a dark-colored surface. When such decals are printed without the white ink base layer, the colors are not as vibrant, and they are transparent. When using eco-solvent ink, it is necessary to use Eco-solvent media compatible water slide decal paper.

When the weathering effects decals are printed on a clear background, there is no need to carefully cut out "windows" or openings in the body of the decal, as the water insoluble resin is clear.

Other types of printing to make decals is also suitable for making the weathering decals of the present invention. The type of printing includes dry transfers (also called rub-ons) which are decals that can be applied without the use of water or other solvent. The decal itself is on a backing material such as paper or plastic sheeting much like a transparency. The dry transfer is placed in the desired location with the backing side up. The decal is then applied by burnishing the backing with a stylus or similar object such as a ballpoint pen. The contact side of the decal includes a pressure-sensitive adhesive; the combination of heat and pressure causes the decal to stick better to the new surface than to the backing. When the backing is removed, the ink remains. This allows for ink only where needed even if the pattern is delicate, because the backing supports the decal while it is being applied. Other types of printing include, but are not limited to heat transfer, pad printing, silk screening, filmless transfer, direct printing, die printing, hydro printing and stencil printing.

Figure 2:
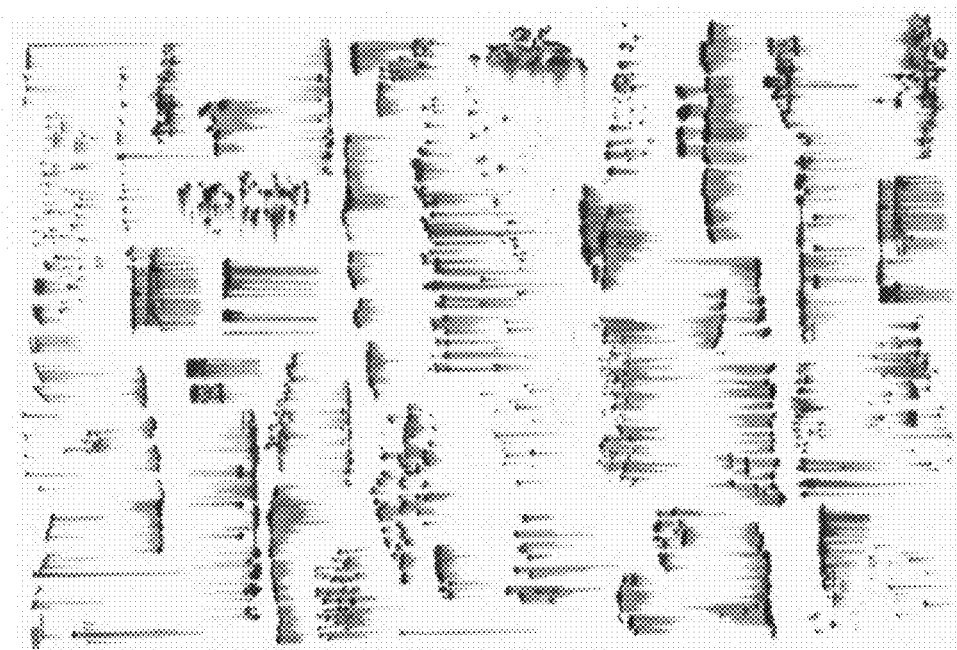
FIG. 2 is a copy of a digital image of a sheet of decals of the weathering effects of the present invention which are medium rust spots.
Figure 3:
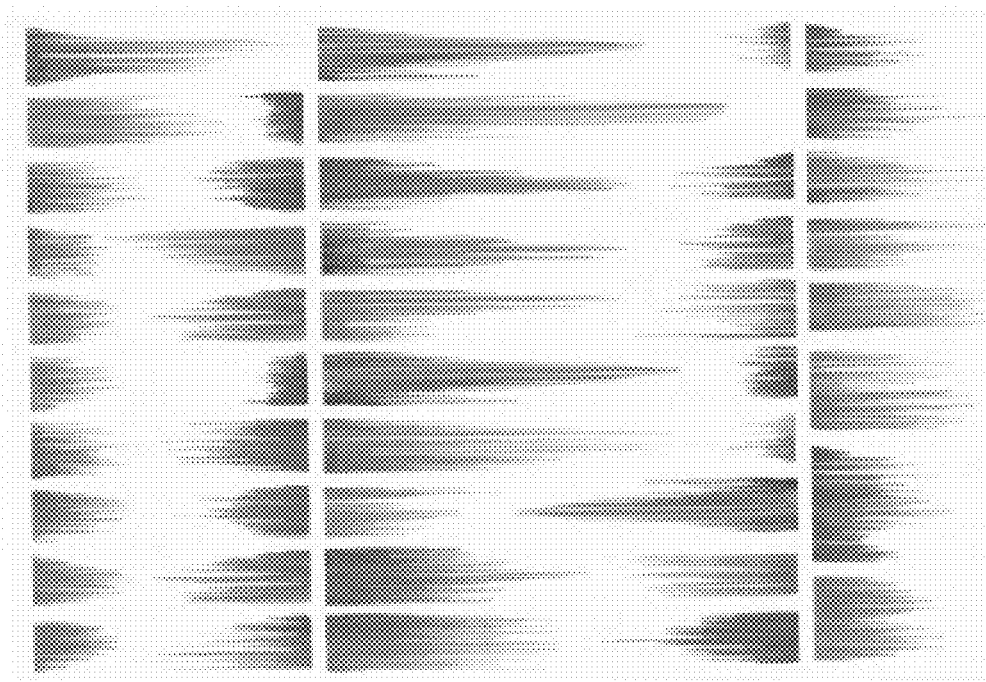
FIG. 3 is a copy of a digital image of a sheet of decals of the weathering effects of the present invention which are medium rust leaches, light.

The present invention is useful for adding weathering effects which include surface deterioration, oxidation, iron oxide or rust, rust streaks, sulfur streaks, scratches, spots, drips, leaching, wheel spray (cast off), tar and road sealer splatters, grease, oil, peeling paint, damage occurring due to man caused accidents, fire incidents, fire damage, smoke damage, discoloration, overlays, impacts, repairs, cover-ups, acid damage, sprayed or brushed paint damage, modifications, re-numbering, splatter, spray, fading, residue, soot, lime dust, flour dust, cement dust, rust blisters, contacts, incidents, general wear and tear, and overall perceived age of such objects, such as models. Markings on the model can have weathering effects, such as faded logos, weathering effects on heralds, truck lines and commercial signage, updates, notices, warnings, placards, instructions, and chemical safety signs including chemical reactions. For real or prototype railroad equipment, trucks and ships, the weathering effect is caused by time and exposure to the outside elements such as sun exposure, precipitation both frozen and unfrozen, incidental residue due to loading/unloading, spillage, preventive maintenance, lubrication, exposure to organic materials in transit, vandalism, chemical reactions, repairs, repaint, re-stencil, and other treatments. The result is faded-out rusty oxidized discolored surfaces. Examples of weathering effects decals used in the present method are shown in FIGS. 1, 2 and 3.

The models include scale railroad cars; locomotives, e.g., steam, diesel and electric; trucks; military vehicles such as tanks and non-scale models; including model cars, trucks, tanks, ships, submarines, buildings, bridges, ads, signs, roadway and pavement. The decal can simulate weathered pavement, sewer lids, manhole covers, grating, handicap ramps, pot holes, pot hole patches, striping, arrows, crosswalks, intersections, printed instructions, oil stains, skid marks, scrapes, median dividers, scuffs, tire marks, mud, dirt, a water puddle or melting ice on or over concrete, snow on a roof or a field. Foliage growing on structures, such as vines, weeds in cracks, ivy or kudzu can be simulated. Using the method of the present invention, the models are weathered after a simulated level of treatment and the application of weathering decals.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A method of providing a weathering effect for a model comprising
   a) illustrating the weathering effect;
   b) copying the weathering effect to form a copy;
   c) formatting the copy to the desired size and color intensity;
   d) printing the copy in white ink onto a transparent medium;
   e) printing the copy in colored ink over the copy in white ink to create a decal, and
   f) mounting the decal onto the model to create a weathering effect on the model;
   wherein the transparent medium around the decal does not need to be trimmed before mounting.

2. The method of claim 1, wherein the transparent medium comprises four layers:
   (1) a water-absorbing porous backing sheet,
   (2) a water soluble resin-coating applied to said backing sheet,
   (3) a waterproof film-forming resin coating, and
   (4) a waterproof media receptive coating.

3. The method of claim 2, wherein the printed decal has a weathering effect side and an adhesive side; and wherein mounting the decal comprises:
   (1) cleaning and drying the model,
   (2) selecting a decal,
   (3) soaking with water the absorbing porous backing sheet,
   (4) sliding a thin film with the decal off the porous backing sheet,
   (5) positioning the decal carried by the thin film to the model, weathering effect side up and adhesive side down,
   (6) pressing the decal onto the model, and
   (7) smoothing the decal and absorbing excess water.

4. The method of claim 3, wherein illustrating the weathering effect is selected from the group of media consisting of acrylic paints, oil paints, photography, pencils, prints, water colors, oils, pastels, markers, dry brushes, chalks, airbrush, sponge application, cotton swab application, make up brush, and dust applicators.

5. The method of claim 1, wherein the printing step is selected from the group consisting of water slide printing, hydro-printing, dry transfer printing, heat transfer printing, pad printing, silk screening, filmless transfer, direct printing, die printing, and stencil printing.

6. The method of claim 1, wherein the weathering effect is selected from the group consisting of surface deterioration, oxidation, iron oxide or rust, rust streaks, sulfur streaks, scratches, spots, drips, leaching, wheel spray, tar and road sealer splatters, grease, oil, peeling paint, fire damage, smoke damage, discoloration, impacts, repairs, acid damage, sprayed or brushed paint damage, re-numbering, splatter, spray, fading, residue, soot, lime dust, flour dust, cement dust, rust blisters.

7. The method of claim 6, wherein the model is selected from the group consisting of railroad cars, trucks, military vehicles, tanks, cars, trucks, ships, submarines, buildings, bridges, ads, signs, roadway and pavement.

8. The method of claim 7, wherein the weathering effects are selected from the group consisting of weathered pavement; weathering effects on sewer lids, manhole covers, grating, handicap ramps, pot holes, pot hole patches, striping, arrows, crosswalks, intersections, median dividers, and printed instructions; oil stains, skid marks, scrapes, scuffs, tire marks, mud, dirt, water puddles, melting ice and snow.

9. The method of claim 5, wherein the decal is dry transfer printed on a backing wherein the backing is paper or plastic sheeting, and the decal is applied using the steps comprising:
   (1) placing the dry transfer decal on the model with the backing side up,
   (2) applying the decal by burnishing the backing with a stylus, and
   (3) removing the backing.

10. A method of providing a weathering effect for a model comprising
   a) illustrating the weathering effect;
   b) copying the weathering effect to form a copy;

c) formatting the copy to the desired size and color intensity;

d) printing the copy in white ink onto a transparent medium;

e) printing the copy in colored ink over the copy in white ink to create a decal, and f) mounting the decal onto the model to create the weathering effect on the model;

wherein the transparent medium around the colored ink copy does not need to be trimmed before mounting; and wherein illustrating weathering effect is selected from the media group consisting of acrylic paints, oil paints, photography, pencils, prints, water colors, oils, pastels, markers, dry brushes, chalks, airbrush, sponge application, cotton swab application, make up brush, and dust applicators.

11. The method of claim 10, wherein the printing step is selected from the group consisting of water slide printing, hydro-printing, dry transfer printing, heat transfer printing, pad printing, silk screening, filmless transfer, direct printing, die printing, and stencil printing.

12. The method of claim 11, wherein the weathering effect is selected from the group consisting of surface deterioration, oxidation, iron oxide or rust, rust streaks, sulfur streaks, scratches, spots, drips, leaching, wheel spray, tar and road sealer splatters, grease, oil, peeling paint, fire damage, smoke damage, discoloration, impacts, repairs, acid damage, sprayed or brushed paint damage, re-numbering, splatter, spray, fading, residue, soot, lime dust, flour dust, cement dust, rust blisters, weathered pavement; weathering effects on sewer lids, manhole covers, grating, handicap ramps, pot holes, pot hole patches, striping, arrows, crosswalks, intersections, median dividers, and printed instructions; oil stains, skid marks, scrapes, scuffs, tire marks, mud, dirt, water puddles, melting ice and snow.

13. The method of claim 12, wherein the model is selected from the group consisting of railroad cars, trucks, military vehicles, tanks, cars, trucks, ships, submarines, buildings, bridges, ads, signs, roadway and pavement.

14. The method of claim 13, wherein the decal is dry transfer printed on a backing wherein the backing is paper or plastic sheeting, and the decal is applied using the steps comprising:

(1) placing the dry transfer decal on the model with the backing side up, (2) applying the decal by burnishing the backing with a stylus, and (3) removing the backing.

15. A method of providing a weathering effect for a model comprising a) illustrating the weathering effect;

b) copying the weathering effects to form a copy;

c) formatting the copy to the desired size, color intensity; and d) printing the copy in white ink onto a transparent medium e) printing the copy in colored ink over the copy in white ink to create a decal, and f) mounting the water slide decal onto the model to create a weathering effect on the model;

wherein the transparent medium around the colored copy does not need to be trimmed before mounting;

wherein the medium comprises four layers:

(1) a water-absorbing porous backing sheet, (2) a water soluble resin-coating applied to said backing sheet, (3) a waterproof film-forming resin coating, and (4) a waterproof media receptive coating.

16. The method of claim 15, wherein the printed decal has a weathering effect side and an adhesive side; and wherein mounting the decal comprises:

(1) cleaning and drying the model, (2) selecting a decal, (3) soaking with water the absorbing porous backing sheet, (4) sliding a thin film with the decal off the porous backing sheet, (5) positioning the decal carried by the thin film to the model, the weathering effect side up and the adhesive side down, (6) pressing the decal onto the model, and (7) smoothing the decal and absorbing excess water.

17. The method of claim 16, wherein the weathering effect is selected from the group consisting of surface deterioration, oxidation, iron oxide or rust, rust streaks, sulfur streaks, scratches, spots, drips, leaching, wheel spray (cast off), tar and road sealer splatters, grease, oil, peeling paint, fire damage, smoke damage, discoloration, impacts, repairs, acid damage, sprayed or brushed paint damage, re-numbering, splatter, spray, fading, residue, soot, lime dust, flour dust, cement dust, rust blisters, weathered pavement; weathering effects on sewer lids, manhole covers, grating, handicap ramps, pot holes, pot hole patches, striping, arrows, crosswalks, intersections, median dividers, and printed instructions; oil stains, skid marks, scrapes, scuffs, tire marks, mud, dirt, water puddles, melting ice and snow.

18. The method of claim 17, wherein the model is selected from the group consisting of railroad cars, trucks, military vehicles, tanks, cars, trucks, ships, submarines, buildings, bridges, ads, signs, roadway and pavement.

\* \* \* \* \*